(12) United States Patent
Oh et al.

(10) Patent No.: US 11,317,448 B2
(45) Date of Patent: Apr. 26, 2022

(54) METHOD AND APPARATUS FOR INITIAL CONNECTION OF WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Sungjin Park, Gyeonggi-do (KR); Jeongho Yeo, Gyeongg-do (KR); Juho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 64 days.

(21) Appl. No.: 16/760,207

(22) PCT Filed: Dec. 26, 2018

(86) PCT No.: PCT/KR2018/016664
§ 371 (c)(1),
(2) Date: Apr. 29, 2020

(87) PCT Pub. No.: WO2019/132511
PCT Pub. Date: Jul. 4, 2019

(65) Prior Publication Data
US 2020/0359427 A1 Nov. 12, 2020

(30) Foreign Application Priority Data
Dec. 26, 2017 (KR) .......................... 10-2017-0180136

(51) Int. Cl.
*H04W 76/10* (2018.01)
*H04L 5/00* (2006.01)
(Continued)

(52) U.S. Cl.
CPC .......... *H04W 76/10* (2018.02); *H04L 5/0048* (2013.01); *H04W 56/001* (2013.01);
(Continued)

(58) Field of Classification Search
CPC .............. H04W 56/00; H04W 56/001; H04W 56/0015; H04W 56/002; H04W 76/00;
(Continued)

(56) References Cited

U.S. PATENT DOCUMENTS 9,065,630 B1 * 6/2015 Xiao ................. H04W 56/0085
9,451,569 B1 * 9/2016 Xiao ................... H04J 11/0076
(Continued)

FOREIGN PATENT DOCUMENTS

CN WO2019/109378 * 12/2017 ............... H04L 7/04
CN WO2018/127125 * 1/2018 ............. H04L 27/26
(Continued)

OTHER PUBLICATIONS

Zte et al., "Overview of NR Initial Access", R1-1611272, 3GPP TSG RAN WG1 Meeting #87, Nov. 14-18, 2016, 4 pages.
(Continued)

*Primary Examiner* — Warner Wong
(74) *Attorney, Agent, or Firm* — The Farrell Law Firm, P.C.

(57) ABSTRACT

Provided are an initial access method and apparatus of a wireless communication system. The initial access method of a terminal in a wireless communication system includes: detecting at least one synchronization signal included in a plurality of synchronization signal blocks; selecting at least one synchronization signal among the detected at least one synchronization signal; and performing an initial access procedure based on the selected at least one synchronization signal.

8 Claims, 11 Drawing Sheets

(51) Int. Cl.
*H04W 56/00* (2009.01)
*H04L 7/10* (2006.01)
*H04L 7/00* (2006.01)
*H04L 27/26* (2006.01)
*H04L 41/0806* (2022.01)

(52) U.S. Cl.
CPC .............. *H04L 7/0004* (2013.01); *H04L 7/10* (2013.01); *H04L 27/2655* (2013.01); *H04L 41/0806* (2013.01)

(58) Field of Classification Search
CPC ... H04W 76/10; H04W 5/003; H04W 5/0048; H04L 41/0806; H04L 7/00; H04L 7/0004; H04L 7/10; H04L 2027/0097; H04L 27/2655
See application file for complete search history.

(56) References Cited

U.S. PATENT DOCUMENTS

| | | | | |
|---|---|---|---|---|
| 2011/0223901 | A1* | 9/2011 | Swarts | H04L 27/2675 455/422.1 |
| 2013/0122822 | A1* | 5/2013 | Srinivasan | H04L 27/26 455/67.13 |
| 2015/0181543 | A1* | 6/2015 | Hwang | H04W 56/0085 370/336 |
| 2016/0270015 | A1* | 9/2016 | Lin | H04W 56/0015 |
| 2016/0374035 | A1* | 12/2016 | Wang | H04W 56/0015 |
| 2018/0234931 | A1* | 8/2018 | Ly | H04W 56/001 |
| 2018/0241605 | A1* | 8/2018 | Luo | H04L 5/0044 |
| 2018/0242324 | A1* | 8/2018 | Luo | H04L 5/0053 |
| 2018/0309533 | A1* | 10/2018 | Yoshimoto | H04J 11/0073 |
| 2018/0324721 | A1* | 11/2018 | Hakola | H04L 5/0048 |
| 2019/0098591 | A1* | 3/2019 | Wu | H04W 76/11 |
| 2019/0327123 | A1* | 10/2019 | Wang | H04J 11/0079 |
| 2019/0373570 | A1* | 12/2019 | Yokomakura | H04W 72/04 |
| 2020/0015239 | A1* | 1/2020 | Guey | H04L 5/005 |
| 2020/0127879 | A1* | 4/2020 | Yokomakura | H04W 48/12 |
| 2020/0195358 | A1* | 6/2020 | Yokomakura | H04W 48/10 |
| 2020/0337007 | A1* | 10/2020 | Jung | H04L 5/005 |
| 2021/0007086 | A1* | 1/2021 | Liu | H04W 72/042 |

FOREIGN PATENT DOCUMENTS

| | | | |
|---|---|---|---|
| EP | 3 493 455 | 6/2019 | |
| TW | WO2018/068723 | * 10/2017 | ........... H04W 4/00 |
| WO | WO 2017/023232 | 2/2017 | |
| WO | WO 2017/209403 | 12/2017 | |
| WO | WO 2017/217719 | 12/2017 | |
| WO | WO 2018/151864 | 8/2018 | |

OTHER PUBLICATIONS

Catt, "NR Initial Access Procedure with Mulit-stage Synchronization Signals", R1-1611374, 3GPP TSG RAN WG1 Meeting #87, Nov. 14-18, 2016, 5 pages.
International Search Report dated Mar. 28, 2019 issued in counterpart application No. PCT/KR2018/016664, 20 pages.
Nokia, Alcatel-Lucent Shanghai Bell, "SS Bandwidth, Numerology and Multiplexing", R1-1701056, 3GPP TSG-RAN WG1 NR AH Meeting Jan. 16-20, 2017, 8 pages.
European Search Report dated Nov. 17, 2020 issued in counterpart application No. 18895878.9-1220, 10 pages.

* cited by examiner

METHOD AND APPARATUS FOR INITIAL CONNECTION OF WIRELESS COMMUNICATION SYSTEM

PRIORITY

This application is a National Phase Entry of PCT International Application No. PCT/KR2018/016664 which was filed on Dec. 26, 2018, and claims priority to Korean Patent Application No. 10-2017-0180136, which was filed on Dec. 26, 2017, the content of each of which is incorporated herein by reference.

TECHNICAL FIELD

The present disclosure relates to an initial access method and apparatus in a wireless communication system.

BACKGROUND ART

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high-frequency band (millimeter wave (mmWave)), e.g., a band of 60 GHz. In order to reduce the path loss of radio waves in such a super-high-frequency band and to increase a transmission distance of radio waves in 5G communication systems, various technologies have been discussed and are being studied, for example: beamforming, massive multiple-input multiple-output (MIMO), Full Dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA) and sparse code multiple access (SCMA), which are advanced access schemes.

The Internet has evolved from a human-based connection network, where humans create and consume information, to the Internet of Things (IoT), where distributed elements, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from connected objects to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

DESCRIPTION OF EMBODIMENTS

As described above, various services are able to be provided due to the development of wireless communication systems, and thus, there is need for methods of effectively providing such services.

Solution to Problem

An initial access method of a terminal in a wireless communication system according to an embodiment, the initial access method may include: detecting at least one synchronization signal included in a plurality of synchronization signal blocks; selecting at least one synchronization signal among the detected at least one synchronization signal; and performing an initial access procedure based on the selected at least one synchronization signal.

Advantageous Effects of Disclosure

According to embodiments, a service can be effectively provided in a wireless communication system.

BEST MODE

Figure 1:
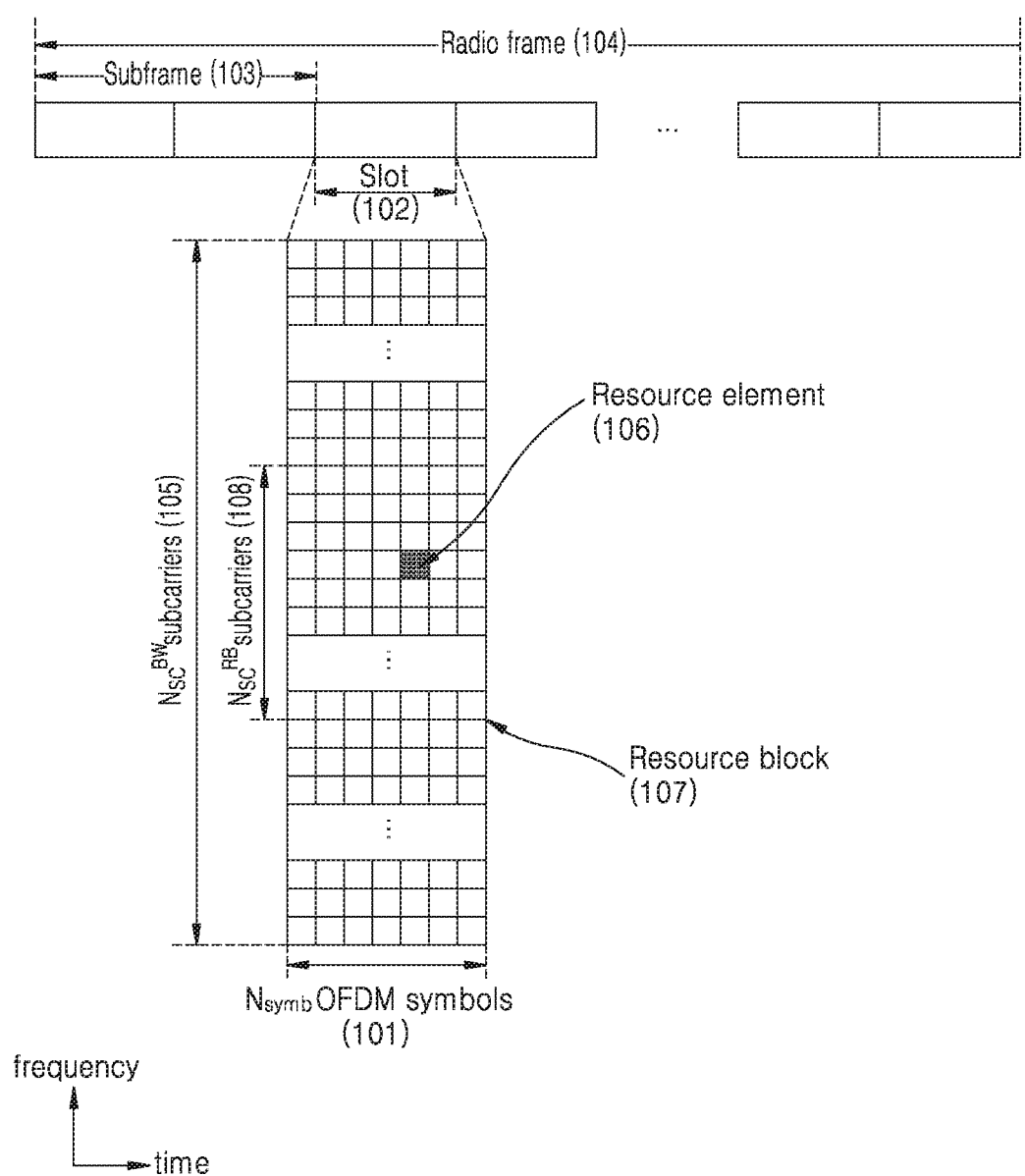
FIG. 1 is a diagram showing a transmission structure of a time-frequency domain that is a downlink radio resource region of a long-term evolution (LTE), long-term evolution advanced (LTE-A), or similar system.

An initial access method of a terminal in a wireless communication system according to an embodiment, the initial access method includes: detecting at least one synchronization signal included in a plurality of synchronization signal blocks; selecting at least one synchronization signal among the detected at least one synchronization signal; and performing an initial access procedure based on the selected at least one synchronization signal.

Mode of Disclosure

Hereinafter, embodiments will be described in detail with reference to accompanying drawings.

In describing the embodiments, descriptions of technical contents that are well known in the technical field to which the disclosure belongs and are not directly related to the disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a 5th generation (5G) or new radio (NR) communication standards are being developed with 5G wireless communication systems.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. In such a multiple access scheme, data or control information of each user is classified by generally assigning and operating the data or control information such that time-frequency resources for transmitting data or control information for each user do not overlap each other, that is, such that orthogonality is established.

As a future communication system after the LTE system, that is, a 5G or NR system, has to be able to freely reflect various requirements of a user and a service provider, and thus, services satisfying various requirements at the same time need to be supported. The services considered for the 5G or NR system include enhanced mobile broadband (eMBB), massive machine type communication (mMTC), ultra reliability low latency communication (hereinafter, URLLC), etc.

The eMBB aims to provide a higher data transfer rate than a data transfer rate supported by the LTE, LTE-A, or LTE-Pro system. For example, in the 5G or NR system, the eMBB should be able to provide a peak data rate of 20 Gbps in the DL and a peak data rate of 10 Gbps in the UL from the viewpoint of one BS. In addition, the 5G or NR system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data transmission rate required in the 5G or NR system.

At the same time, the mMTC is being considered to support application services such as Internet of things (IoT) in the 5G or NR system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G or NR system. The terminals that support the mMTC should be configured as inexpensive terminals and require very long battery lifetime, such as 10 to 15 years, because it is difficult to frequently replace batteries of the terminals.

Lastly, the URLLC is a cellular-based wireless communication system used for a specific purpose (mission-critical). For example, a service used in remote control for a robot or machinery, industrial automation, unmanned aerial vehicle, remote health care, or emergency alert may be considered. Accordingly, communication provided by the URLLC should provide very low latency and very high reliability. For example, a service supporting the URLLC should satisfy air interface latency smaller than 0.5 milliseconds and at the same time, has a packet error rate of $10^{-5}$ or less. Accordingly, for the service supporting the URLLC, the 5G or NR system is required to provide a transmit time interval (TTI) shorter than those for other services while securing reliable communication links by allocating a broad resource in a frequency band.

The three services, that is, eMBB, URLLC, and mMTC, of the 5G or NR system may be multiplexed in one system and may be transmitted. In this case, the services may use different transmission and reception methods and transmission and reception parameters in order to meet their different requirements.

Terms used below are defined in consideration of functions in the present disclosure, and may have different meanings according to an intention of a user or operator, customs, or the like. Thus, the terms should be defined based on the description throughout the specification. Hereinafter, a base station is an entity that assigns resources of a terminal, and may be at least one of an eNode B (eNB), a Node B (NB), a base station (BS), a wireless access unit, a BS controller, and a node on a network. Examples of a terminal may include user equipment (UE), a mobile station (MS), a cellular phone, a smartphone, a computer, and a multimedia system capable of performing a communication function. In the present disclosure, a downlink (DL) is a wireless transmission path of a signal transmitted from a base station to a terminal, and an uplink (UL) is a wireless transmission path of a signal transmitted from a terminal to a base station. Also, hereinbelow, one or more embodiments of the present disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. Also, it will be understood by one of ordinary skill in the art that embodiments of the present disclosure may be applied to other communication systems through some modifications without departing from the scope of the present disclosure.

Hereinafter, in the present disclosure, processes of a terminal, such as cell identification (ID) determination, synchronization obtainment, and system information obtainment, will be described in combination with a primary synchronization signal (PSS)/secondary synchronization signal (SSS) detection process or synchronization signal block detection process, but the present disclosure may be interpreted without largely departing from the scope of the present disclosure according to the determination of one of ordinary skill in the art.

Also, in the present disclosure, examples of a PSS/SSS detection method of a terminal include various methods including a correlation value and coherent detection, but since the details about the PSS/SSS detection method is irrelevant to the subject matter of the present disclosure, detailed descriptions thereof will be omitted.

FIG. 1 is a diagram showing a transmission structure of a time-frequency domain that is a downlink radio resource region of a LTE system or a similar system.

FIG. 1 is a diagram showing a basic structure of the time-frequency domain that is the radio resource region through which data or a control channel is transmitted from a downlink in the LTE system.

In FIG. 1, a horizontal axis represents a time domain and a vertical axis represents a frequency domain in the radio resource region. In the time domain, the minimum transmission unit is an OFDM symbol, and $N_{symb}$ OFDM symbols 101 are gathered to constitute one slot 102, and two slots are gathered to constitute one sub-frame 103. The length of the slot is 0.5 ms, and the length of the sub-frame is 1.0 ms. Further, a radio frame 104 is a time domain interval composed of 10 sub-frames. The minimum transmission unit in the frequency domain is a subcarrier, and a transmission bandwidth of the whole system may be composed of $N_{RB}^{DL}$ subcarriers 105 in total. However, such specific numerical values may vary according to a system.

In the time-frequency domain, a base unit of a resource is a resource element (RE) 106, and may be indicated as an OFDM symbol index and a subcarrier index. A resource block (RB) 107 or a physical resource block (PRB) is defined as $N_{symb}$ successive OFDM symbols 101 in the time domain and $N_{RB}$ successive subcarriers 108 in the frequency domain. Accordingly, one RB 107 is composed of $N_{symb} \times N_{RB}$ REs 112 in one slot.

In general, the minimum transmission unit of data is RB, and in the LTE system, it is general that $N_{symb}$ is 7 and $N_{RB}$ is 12, and $N_{BW}$ and $N_{RB}$ are in proportion to the system transmission bandwidth. However, another value may be used in a system other than the LTE system.

Next, a structure of a synchronization signal in an LTE or LTE-A system will be described in detail with reference to the drawings.

Figure 2:
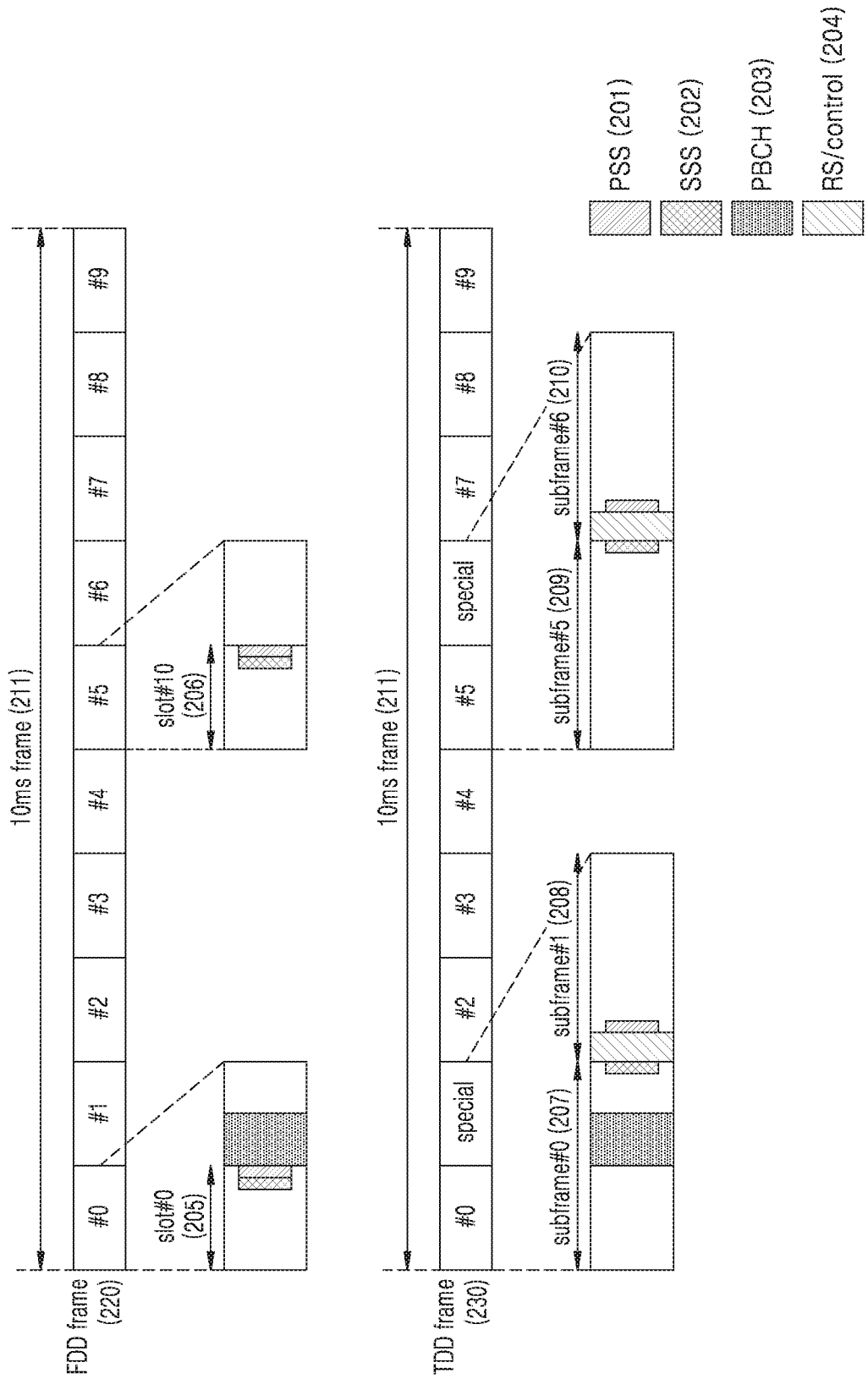
FIG. 2 is a diagram showing a structure in which a synchronization signal and a broadcast channel are transmitted in an LTE system.

FIG. 2 is a diagram showing a structure in which a synchronization signal and a broadcast channel are transmitted in an LTE system.

Referring to FIG. 2, a PSS 201 and an SSS 202, which are synchronization signals of an LTE system, and a physical broadcast channel (PBCH) 203 that is a broadcast channel transmitting system information are each shown. Transmission methods of the PSS 201, the SSS 202, and the PBCH 203 may vary based on a duplex mode.

In the case of frequency division duplex (FDD) 220 of FIG. 2, the PSS 201 is transmitted in first slots of 0th and 5th subframes, i.e., in last symbols of a slot #0 205 and a slot #10 206, and the SSS 202 is transmitted in second last symbols of the same slots 205 and 206, i.e., in symbols immediately preceding the PSS 201. The PBCH 203 is transmitted over total 4 symbols in a symbol immediately next to a symbol in which the PSS 201 is transmitted.

In the case of time division duplex (TDD) 230 of FIG. 2, the PSS 201 is transmitted in third symbols of a subframe #1 208 and a subframe #6 210, and the SSS 202 is transmitted in last symbols of the subframe #1 208 and the subframe #6 210, i.e., three symbols before the PSS 201. The PBCH 203 is transmitted over total 4 symbols from a first symbol of a slot in which the SSS 202 is transmitted.

When a duplex method is not pre-known in an LTE system, the duplex method to be used may be determined via a location difference between synchronization signals of FDD and TDD.

In the LTE system, the PSS may be mapped to three different sequences according to a cell ID, and the sequences are generated as Zadoff-Chu (ZC) sequences of length 63. The sequences may be mapped to 73 subcarriers, i.e., 6 RBs, in the middle of an entire band, and then transmitted. By detecting the PSS, 5 ms timing of a cell may be determined and a location of SSS that is ahead of the PSS by a fixed offset may be determined. Also, a physical layer ID in a cell ID group may be determined.

In the LTE system, the SSS may be mapped to 168 different sequences according to the cell ID group, and the sequences are generated based on two m-sequences of length 31 and frequency interleaving of X and Y. In one cell, two SSSs ($SSS_1$ in subframe 0 and $SSS_2$ in subframe 5) are present, and $SSS_1$ and $SSS_2$ are uses the same sequence by changing positions in a frequency domain. By detecting the SSS, frame timing may be found by using sequences X and Y being switched between $SSS_1$ and $SSS_2$. Also, because a physical layer ID group is determined, an actual cell ID may be obtained by combining the physical layer ID group and a physical layer ID obtained from the PSS.

In the LTE system, total 504 different physical layer IDs are defined, and the 504 different physical layer IDs are divided into 168 cell ID groups (physical layer ID groups) each including 3 cell IDs (physical layer IDs). PSS in one cell may have three different values according to physical layer ID. In particular, three cell IDs in one physical layer ID group may correspond to different PSSs. Thus, when a terminal detects a PSS of a cell, the terminal may determine one of three physical layer IDs. Even when one of the physical layer IDs is obtained, a physical layer ID group itself is not determined, and thus available cell IDs are reduced from 504 to 168. The SSS may have 168 different values according to the physical layer ID groups, and thus when the terminal detects the SSS of the cell, one of 168 physical layer ID groups may be determined. As a result, one of 504 cell IDs may be determined by combining the physical layer ID group and the physical layer ID determined by detecting the PSS and the SSS. This may be represented by Equation 1 below.

$$N_{ID}^{cell} = 3N_{ID}^{(1)} + N_{ID}^{(2)} \qquad \text{[Equation 1]}$$

$N_{ID}^{(1)}$ is a value for a physical layer ID group having a value between 0 and 167 and is estimated from SSS. $N_{ID}^{(2)}$ is a value for a physical layer ID having a value between 0 and 2 and is estimated from PSS.

Referring to FIG. 2, the PBCH 203 that is a broadcast channel transmitting system information (SI) is shown. The terminal may synchronize with a cell via the synchronization signal described above, and accordingly, obtain the physical layer ID and find cell frame timing. Upon success, the terminal may obtain a limited amount of SI called master information block (MIB) through the PBCH 203. In particular, the MIB contains following information.

Information about DL cell bandwidth: 4 bits in MIB is used to indicate DL bandwidth. For each frequency band, different bandwidths may be defined up to 16 that is defined by the number of RBs.

Information about physical hybrid automatic request for repetition (ARQ) indicator channel (PHICH) configuration of cell: 3 bits in MIB is used to indicate PHICH configuration information. The terminal needs to identify PHICH configuration information to receive a required physical downlink control channel (PDCCH).

System frame number (SFN): 8 bits in MIB is used to indicate a part of SFN. 2 bits of least significant bit (LSB) of SFN may be indirectly obtained via PBCH decoding.

One transport block corresponding to the MIB is transmitted every 40 ms. In other words, a transmit time interval (TTI) of the PBCH 203 is 40 ms. In particular, the PBCH 203 is mapped to a first subframe of each frame in four consecutive frames 211, i.e., to a subframe #0 207 and transmitted. The PBCH 203 is transmitted over 72 subcarriers (i.e., 6 RBs based on a frequency axis) in the middle of first four OFDM symbols of a second slot of the subframe #0 207. By repeatedly transmitting the same PBCH 203 four times for 4 ms, energy sufficient to decode terminals with poor channel conditions without an error may be secured. Terminals with good channel states may be decoded even by receiving a part of the repeated PBCH 203.

Hereinabove, a method of transmitting a synchronization signal and PBCH in an LTE system has been described. Hereinafter, a 5G or NR system will be described.

First, subcarrier spacing considered in the 5G or NR system will be described.

In the 5G or NR system, a frame structure needs to be flexibly defined and operated considering various services and requirements. For example, the services may have different subcarrier spacings based on the requirements.

Equation 2 below may be used to determine a method of supporting a plurality of subcarrier spacings in the 5G or NR communication system.

$$\Delta f = f_0 2^m \quad \text{[Equation 2]}$$

Here, $f_0$ indicates a base subcarrier spacing of a system and m denotes a scaling factor of an integer. For example, when $f_0$ is 15 kHz, a set of subcarrier spacings of the 5G communication system may include 3.75 kHz, 7.5 kHz, 15 kHz, 30 kHz, 60 kHz, 120 kHz, 240 kHz, and 480 kHz. An available subcarrier spacing set may vary according to frequency bands. For example, 3.75 kHz, 7.5 kHz, 15 kHz, 30 kHz, and 60 kHz may be used in a frequency band smaller than or equal to 6 GHz, and 60 kHz, 120 kHz, 240 kHz, and 480 kHz may be used in a frequency band equal to or greater than 6 GHz.

A length of OFDM symbol may vary according to a subcarrier spacing constituting the OFDM symbol. This is because the subcarrier spacing and the length of the OFDM symbol have a reciprocal relationship with each other. For example, when the subcarrier spacing is doubled, the symbol length is shortened by half, and when the subcarrier spacing is reduced by ½, the symbol length is doubled.

Next, a structure in which a synchronization signal and PBCH are transmitted in a 5G or NR system will be described.

Figure 3:
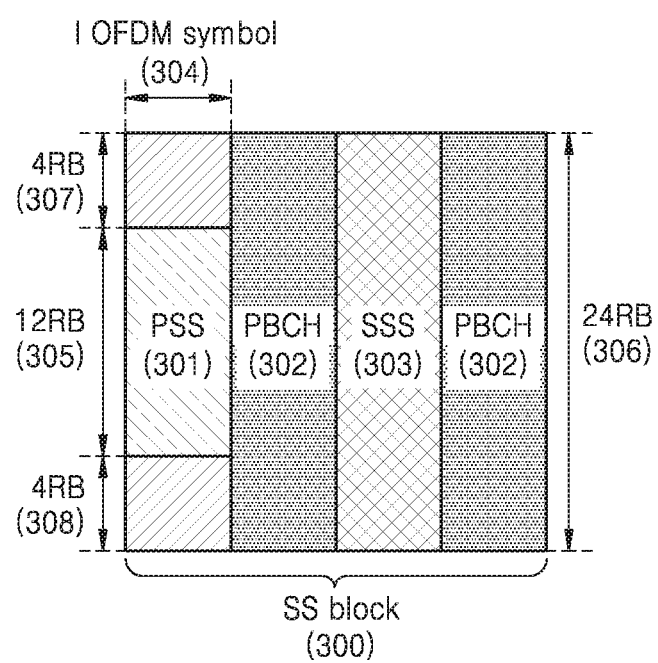
FIG. 3 is a diagram showing a synchronization signal (SS) block 300 in a 5th generation (5G) or new radio (NR) system, according to an embodiment.

FIG. 3 is a diagram showing synchronization signal (SS) block 300 in a 5G or NR system, according to an embodiment.

The SS block 300 includes a PSS 301, an SSS 303, and a PBCH 302.

In the PSS 301 and the SSS 303, 12 RBs 305 may be transmitted in a frequency axis and one OFDM symbol 304 may be transmitted in a time axis. In the 5G or NR system, total 1008 different cell IDs may be defined, wherein the PSS 301 may have three different values and the SSS 303 may have 336 different values according to physical layer IDs of a cell. A terminal may determine one of 1008 cell IDs by detecting and combining the PSS 301 and the SSS 303. This may be represented by Equation 1 below.

$$N_{ID}^{cell} = 3N_{ID}^{(1)} + N_{ID}^{(2)} \quad \text{[Equation 1]}$$

$N_{ID}^{(1)}$ may be estimated from the S and have a value between 0 and 335. $N_{ID}^{(2)}$ may be estimated from the P and have a value between 0 and 2. A value of $N_{ID}^{cell}$ that is a cell ID may be estimated from a combination of $N_{ID}^{(1)}$ and $N_{ID}^{(2)}$.

In the PBCH 302, 20 RBs 306 may be transmitted in the frequency axis and second OFDM symbols 304 may be transmitted in a time axis. Various types of system information called MIB may be transmitted in the PBCH 302 and some or all of following contents may be transmitted via the PBCH 302.

(Part of) SFN: 7-10 bits
At least 80 ms granularity
H-SFN: 10 bits
Timing information within radio frame: [0-7] bits
E.g., SS block time index: 0 (for below 6 GHz) or 3 (for above 6 GHz) bits
E.g., half radio frame timing: [0-1] bit
RMSI scheduling information: [x] bits
CORESET(s) information: [x] bits
Simplified information of CORESET(s) configuration
E.g., Time/frequency resource configuration of CORESET(s)
Numerology of RMSI: [0-2] bits
Information regarding frequency resources for PDSCH scheduling: [x] bits
Information regarding bandwidth part: [x] bits
Information for quick identification that there is no corresponding RMSI to the PBCH: [0-1] bit
Information for quick identification that UE cannot camp on the cell: [0-1] bit
SS burst set periodicity: [0-3] bits
Information on actual transmitted SS block(s): [0-x] bits
Area ID: x bits
Value tag: x bits
cell ID extension: x bits
Information on tracking RS: x bits
Reserved bits: [x>0] bits As described above, the SS block 300 includes the PSS 301, the SS block 300, and the PBCH 302, and mapped to total 4 OFDM symbols in the time axis. Because a transmission bandwidth (12 RBs 305) of the PSS 301 and transmission bandwidths (20 RBs 306) of the SSS 303 and PBCH 302 are different from each other, an OFDM symbol in which the PSS 301 and the SSS 303 are transmitted within the transmission bandwidth (20 RBs 306) of the PBCH 302 may include four RBs (corresponding to RBs 307 and 308 in FIG. 3) at both sides excluding 12 RBs in the middle in which the PSS 301 is transmitted, wherein the RBs 307 and 308 may be used to transmit another signal or may be empty.

The SS block 300 may be transmitted via the same analog beam. In other words, the PSS 301, the SSS 303, and the PBCH 302 may be transmitted via the same beam. Because the analog beam is not applicable in the frequency axis, the same analog beam is applied to all RBs in the frequency axis in a specific OFDM symbol to which a specific analog beam is applied. In other words, four OFDM symbols in which the P, the SSS 303, and the PBCH 302 are transmitted may be transmitted via the same analog beam.

Figure 4:
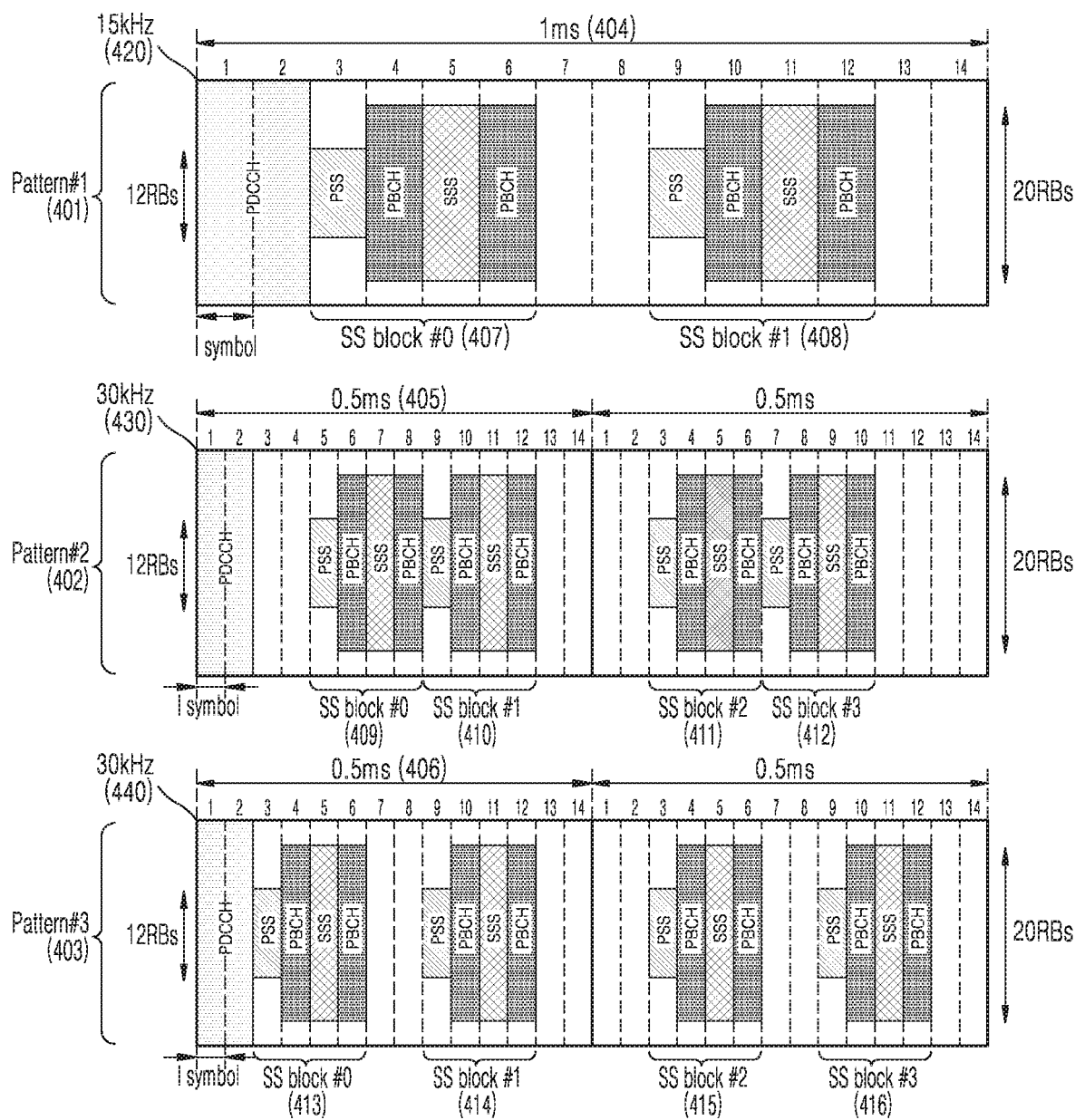
FIG. 4 is a diagram showing a transmission pattern of an SS block in a frequency band of 6 GHz or less, which is considered in a 5G or NR system, according to an embodiment.

FIG. 4 is a diagram showing a transmission pattern of an SS block in a frequency band of 6 GHz or less, which is considered in a 5G or NR system, according to an embodiment.

In the 5G or NR system, the frequency band of 6 GHz or less may use 15 kHz subcarrier spacing 420 and 30 kHz subcarrier spacings 430 and 440 for SS block transmission. In the 15 kHz subcarrier spacing 420, a transmission pattern (pattern #1 401 of FIG. 4) for one SS block is present, and in the 30 kHz subcarrier spacings 430 and 440, transmission patterns (pattern #2 402 and pattern #3 403 of FIG. 4) for two SS blocks is present.

Maximum two SS blocks may be transmitted within a time of 1 ms 404 (or a length of one slot when one slot includes 14 OFDM symbols) in the pattern #1 401 of the SS block in the 15 kHz subcarrier spacing 420. FIG. 4 illustrates an SS block #0 407 and an SS block #1 408. Here, the SS block #0 407 may be mapped to four consecutive symbols in a third OFDM symbol, and the SS block #1 408 may be mapped to four consecutive symbols in a ninth OFDM symbol. Different analog beams may be applied to the SS block #0 407 and the SS block #1 408. Accordingly, the same beam may be applied to all third to sixth OFDM symbols to which the SS block #0 407 is mapped, and the same beam may be applied to all ninth to twelfth OFDM symbols to which the SS block #1 408 is mapped. A base station may freely determine which beam to use for 7th, 8th, 13th, and 14th OFDM symbols to which an SS block is not mapped.

Maximum two SS blocks may be transmitted within a time of 0.5 ms 405 (or a length of one slot when one slot includes 14 OFDM symbols) in the pattern #2 402 of the SS block in the 30 kHz subcarrier spacing 430, and accordingly, maximum four SS blocks may be transmitted within a time of 1 ms (or a length of two slots when one slot includes 14 OFDM symbols). Referring to FIG. 4, an SS block #0 409, an SS block #1 410, an SS block #2 411, and an SS block #3 412 are transmitted in 1 ms (two slots). Here, the SS block #0 409 and the SS block #1 410 may be respectively mapped to fifth and ninth OFDM symbols of a first slot, and the SS block #2 411 and the SS block #3 412 may be respectively mapped to third and seventh OFDM symbols of a second slot. Different analog beams may be applied to the SS block #0 409, the SS block #1 410, the SS block #2 411, and the SS block #3 412. Accordingly, the same analog beam may be applied to the 5th to 8th OFDM symbols of the first slot in which the SS block #0 409 is transmitted, the 9th to 12th OFDM symbols of the first slot in which the SS block #1 410 is transmitted, the 3rd to 6th OFDM symbols of the second slot in which the SS block #2 411 is transmitted, and the 7th to 10th OFDM symbols of the second slot in which the SS block #3 412 is transmitted. The base station may freely determine which beam to use for OFDM symbols to which an SS block is not mapped.

Maximum two SS blocks may be transmitted within a time of 0.5 ms 406 (or a length of one slot when one slot includes 14 OFDM symbols) in the pattern #3 403 of the SS block in the 30 kHz subcarrier spacing 440, and accordingly, maximum four SS blocks may be transmitted within a time of 1 ms (or a length of two slots when one slot includes 14 OFDM symbols). Referring to FIG. 4, an SS block #0 413, an SS block #1 414, an SS block #2 415, and an SS block #3 416 are transmitted in 1 ms (two slots). Here, the SS block #0 413 and the SS block #1 414 may be respectively mapped to third and ninth OFDM symbols of a first slot, and the SS block #2 415 and the SS block #3 416 may be respectively mapped to third and ninth OFDM symbols of a second slot. Different analog beams may be used for the SS block #0 413, the SS block #1 414, the SS block #2 415, and the SS block #3 416. As described above, the same analog beam may be used in all four OFDM symbols in which an SS block is transmitted, and the base station may determine which beam to use for OFDM symbols to which an SS block is not mapped.

Figure 5:
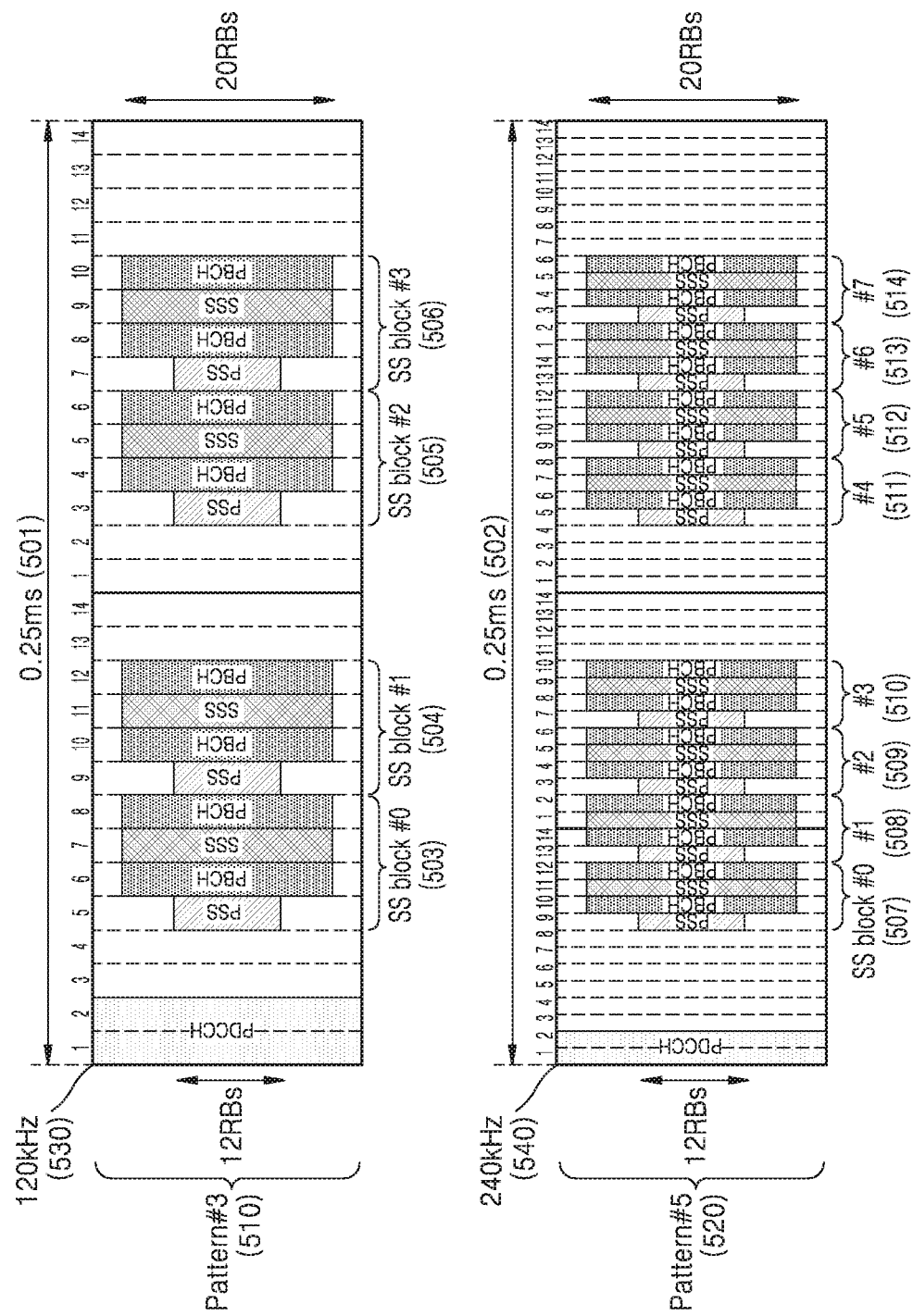
FIG. 5 is a diagram showing a transmission pattern of an SS block in a frequency band of 6 GHz or above, which is considered in a 5G or NR system, according to an embodiment.

FIG. 5 is a diagram showing a transmission pattern of an SS block in a frequency band of 6 GHz or above, which is considered in a 5G or NR system, according to an embodiment.

In the 5G or NR system, the frequency band of 6 GHz or above may use 120 kHz subcarrier spacing 530 and 240 kHz subcarrier spacing 540 for SS block transmission.

Maximum four SS blocks may be transmitted within a time of 0.25 ms 501 (or a length of two slots when one slot includes 14 OFDM symbols) in a pattern #4 510 of the SS block in the 120 kHz subcarrier spacing 530. Referring to FIG. 5, an SS block #0 503, an SS block #1 504, an SS block #2 505, and an SS block #3 506 are transmitted in 0.25 ms (two slots). Here, the SS block #0 503 and the SS block #1 504 may be respectively mapped to fifth and ninth OFDM symbols of a first slot, and the SS block #2 505 and the SS block #3 506 may be respectively mapped to third and seventh OFDM symbols of a second slot. As described above, different analog beams may be used for the SS block #0 503, the SS block #1 504, the SS block #2 505, and the SS block #3 506. The same analog beam may be used in all four OFDM symbols in which an SS block is transmitted, and the base station may determine which beam to use for OFDM symbols to which an SS block is not mapped.

Maximum eight SS blocks may be transmitted within a time of 0.25 ms 502 (or a length of four slots when one slot includes 14 OFDM symbols) in a pattern #5 520 of the SS block in the 240 kHz subcarrier spacing 540. Referring to FIG. 5, an SS block #0 507, an SS block #1 508, an SS block #2 509, an SS block #3 510, an SS block #4 511, an SS block #5 512, an SS block #6 513, and an SS block #7 514 are transmitted in 0.25 ms (four slots). Here, the SS block #0 507 and the SS block #1 508 may be respectively mapped to 9th and 13th OFDM symbols of a first slot, the SS block #2 509 and the SS block #3 510 may be respectively mapped to 3rd and 7th OFDM symbols of a second slot, the SS block #4 511, the SS block #5 512, and the SS block #6 513 may be respectively mapped to 5th, 9th, and 13th OFDM symbols of a third slot, and the SS block #7 514 may be mapped to 3rd OFDM symbol of a fourth slot.

As described above, the SS block #0 507, the SS block #1 508, the SS block #2 509, the SS block #3 510, the SS block #4 511, the SS block #5 512, the SS block #6 513, and the SS block #7 514 may use different analog beams. The same analog beam may be used in all four OFDM symbols in which an SS block is transmitted, and the base station may determine which beam to use for OFDM symbols to which an SS block is not mapped.

Maximum 64 SS blocks are transmittable in a specific time interval (for example, 5 ms interval) and a number L of transmitted SS blocks may vary according to a value of at least one of subcarrier spacing of the SS block and a carrier frequency in which the SS block is transmitted. For example, maximum 4 SS blocks may be transmitted in a frequency band of 3 GHz or lower, maximum 8 SS blocks may be transmitted in a frequency band from 3 GHz to 6 GHz, and maximum 64 SS blocks may be transmitted in a frequency band of 6 GHz or above in the corresponding time interval.

Also, the 5G or NR system supports various sizes of bandwidths. For example, the various sizes of bandwidths from a narrow bandwidth to a wide bandwidth, for example, 50 MHz to 400 MHz, are supported, and a size of a supportive bandwidth of a terminal may vary based on bandwidth (BW) capability of the terminal. Accordingly, for a base station and a terminal having different sizes of bandwidths, the 5G or NR system may support such bandwidths to transmit a plurality of SS blocks. This will be described with reference to FIG. 6.

Figure 6:
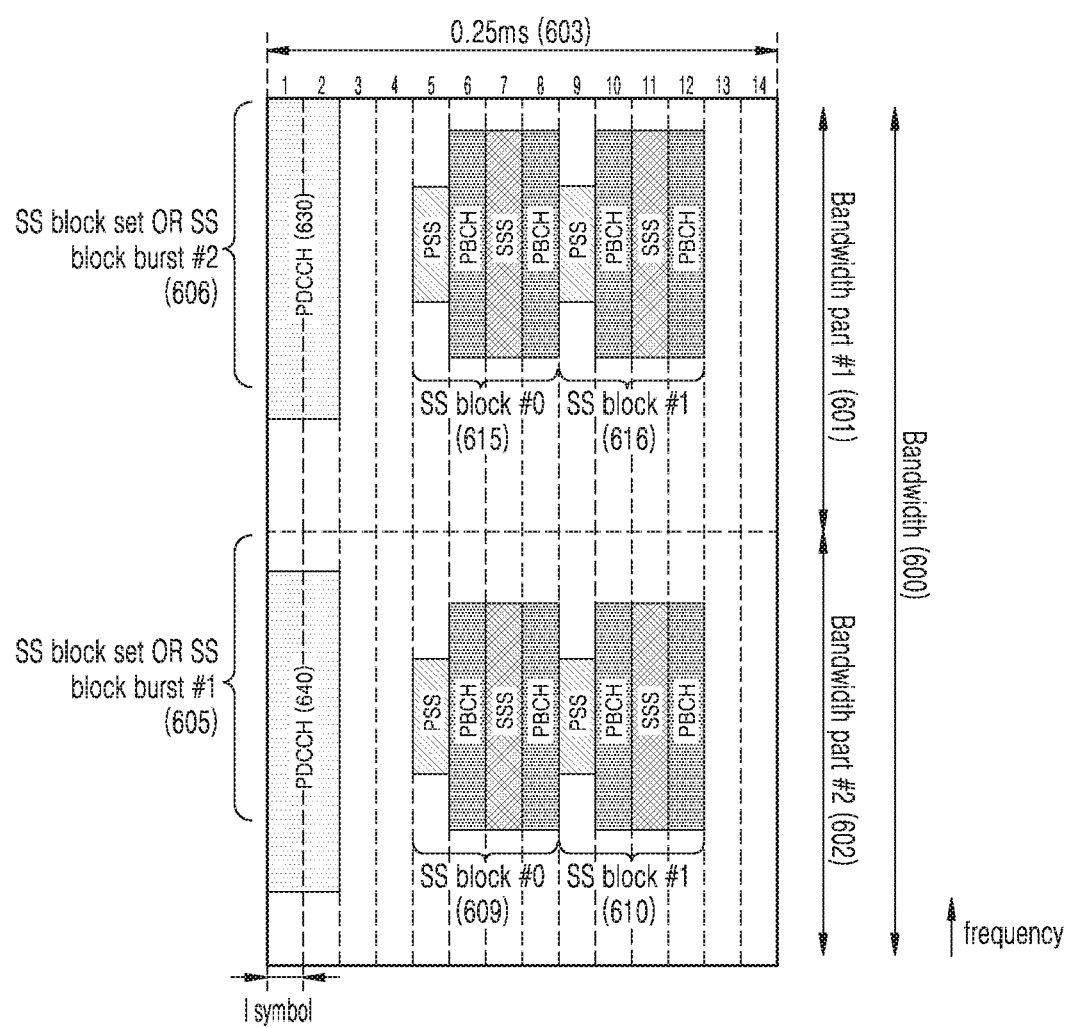
FIG. 6 is a diagram for describing a method of transmitting a plurality of SS blocks in a 5G or NR system, according to an embodiment.

FIG. 6 is a diagram for describing a method of transmitting a plurality of SS blocks in a 5G or NR system, according to an embodiment.

Referring to FIG. 6, locations of SS blocks may vary according to sizes of bandwidths of the 5G or NR system, and the number of SS blocks divided and transmitted in a frequency axis within the bandwidths may also vary. In other words, a base station may transmit a plurality of SS block sets (SS block set #1 605 and SS block set #2 606) divided in a frequency axis in a bandwidth 600. Here, the plurality of SS block sets divided and transmitted in the frequency axis may be transmitted to each of bandwidth parts obtained by dividing the bandwidth 600 in the frequency axis. For example, the SS block set #1 605 may be transmitted in a bandwidth part #1 601 and the SS block set #2 606 may be transmitted in a bandwidth part #2 602. In other words, only one SS block set may be transmitted in the frequency axis in one bandwidth part. Here, the plurality of SS block sets may be divided and transmitted in the frequency axis without separately distinguishing a bandwidth part, or the plurality of SS block sets may be divided and transmitted in the frequency axis in one bandwidth part. Because a terminal may receive configuration information about the bandwidth part via a PBCH, SIB, or a higher signal after a synchronization signal and the PBCH are detected, the terminal is unable to determine the configuration information about the bandwidth part during an operation period of the terminal described in the present disclosure. In other words, when the plurality of SS block sets are divided and transmitted in the frequency axis in the bandwidth 600, the terminal at a point of time when the synchronization signal is detected may detect the plurality of SS block sets or an SS block during an initial access operation in the bandwidth 600. Here, an initial access resource, procedure, and the like including random access channel (RACH) resource selection of the terminal may vary based on the SS block detected by the terminal. Accordingly, upon detecting a plurality of synchronization signals, the terminal requires a method of performing an initial access procedure by determining a synchronization signal for performing an initial access operation.

First Example

A synchronization signal detecting and PBCH detecting method of a terminal in a slot in which an SS block is transmitted, according to a first example of the present disclosure, will be described with reference to FIG. 6.

The terminal that performs a specific frequency band carrier or cell search operation may determine a cell ID by attempting pre-defined PSS and SSS detection, generate a demodulation reference signal for PBCH detection by using the determined cell ID, and decode a PBCH. The terminal may obtain DL time synchronization with respect to a detected cell by obtaining SFN information via the PBCH. Also, the terminal may obtain system information regarding the cell by receiving information related to a control channel transmission region where scheduling information for a system information block is transmitted via the PBCH.

Hereinafter, in the present disclosure, processes of a terminal, such as cell ID determination, synchronization obtainment, and system information obtainment, will be described in combination with a PSS/SSS detection process or synchronization signal block detection process, but the present disclosure may be interpreted without largely departing from the scope of the present disclosure according to the determination of one of ordinary skill in the art.

Also, in the present disclosure, examples of a PSS/SSS detection method of a terminal include various methods including a correlation value and coherent detection, but since the details about the PSS/SSS detection method is irrelevant to the subject matter of the present disclosure, detailed descriptions thereof will be omitted.

As shown in FIG. 6, in the case of the system or base station transmitting the plurality of SS blocks in the specific frequency band carrier or cell, the terminal may detect the plurality of PSSs/SSSs. Also, when an SS block transmission frequency axis resource region is variable according to system or base station configuration, the terminal that performs initial access may perform PSS/SSS detection operation for each candidate frequency location in which the SS block is transmittable. Accordingly, as shown in FIG. 6, when the base station or cell transmits the plurality of SS block sets (SS block set #1 605 and SS block set #2 606) divided in the frequency axis in the bandwidth 600, the terminal may attempt to detect the plurality of SS blocks among the SS blocks, detect the plurality of SS blocks, and perform the initial access procedure with a carrier or cell by using at least one SS block among the detected SS blocks.

A method of detecting the plurality of SS blocks and a method of performing the initial access procedure with the cell by selecting at least one SS block among the detected SS blocks, the methods performed by the terminal, will now be described.

Method 1: Sequential Detection from Low Frequency to High Frequency

A terminal may perform SS block detection sequentially from a low frequency to a high frequency of a carrier or cell (hereinafter, cell) on which cell search or initial access is to be performed. When a candidate frequency axis location in which an SS block is transmittable is defined or set in the corresponding cell, the terminal attempts the SS block detection at the candidate frequency axis location. For example, the terminal may attempt the SS block detection with respect to the cell in an order from an SS block set #1 transmitted in the low frequency axis to an SS block #2 transmitted in the high frequency axis. In particular, referring to FIG. 6, the terminal may attempt the SS block detection with respect to the cell in an order of an SS block #0 609, an SS block #0 615, an SS block #1 610, and an SS block #1 616. At this time, in order to minimize a frequency change for the SS block detection, the terminal may attempt the SS block detection by minimizing a change in the SS block detection frequency axis location, for example, an order of the SS block #0 609, the SS block #0 615, the SS block #1 616, and the SS block #1 610.

Method 2: Sequential Detection from High Frequency to Low Frequency

A terminal may perform SS block detection sequentially from a high frequency to a low frequency of a carrier or cell (hereinafter, cell) on which cell search or initial access is to be performed. When a candidate frequency axis location in which an SS block is transmittable is defined or set in the corresponding cell, the terminal attempts the SS block detection at the candidate frequency axis location. For example, the terminal may attempt the SS block detection with respect to the cell in an order from an SS block set #2 transmitted in the high frequency axis to an SS block #1 transmitted in the low frequency axis. In particular, referring to FIG. 6, the terminal may attempt the SS block detection with respect to the cell in an order of the SS block #0 615, the SS block #0 609, the SS block #1 616, and the SS block #1 610. At this time, in order to minimize a frequency change for the SS block detection, the terminal may attempt the SS block detection by minimizing a change in the SS block detection frequency axis location, for example, an order of the SS block #0 615, the SS block #0 609, the SS block #1 610, and the SS block #1 616.

Method 3: SS Block Detection of High Frequency after Time Sequential Detection from SS Block of Low Frequency A terminal may sequentially attempt detection with respect to SS block candidates transmitted from a low frequency axis of a carrier or cell (hereinafter, cell) on which cell search or initial access is to be performed, and perform detection with respect to SS block candidates transmitted from a high frequency axis. When a candidate frequency axis location in which an SS block is transmittable is defined or set in the corresponding cell, the terminal attempts the SS block detection at the candidate frequency axis location. For example, the terminal may attempt SS block detection in an order of an SS block set #2 transmitted from the high frequency axis after detection with respect to an SS block candidate transmitted from an SS block set #1 transmitted from the low frequency axis with respect to the cell. In particular, referring to FIG. 6, the terminal may attempt the SS block detection with respect to the SS block #0 615 and the SS block #1 616 after the SS block detection with respect to the SS block #0 609 and the SS block #1 610. At this time, in order to minimize a time change for the SS block detection, the terminal may attempt the SS block detection by minimizing a change in the SS block detection time axis location, for example, an order of the SS block #0 609, the SS block #0 615, the SS block #1 616, and the SS block #1 610.

Method 4: SS Block Detection of Low Frequency after Time Sequential Detection from SS Block of High Frequency A terminal may sequentially attempt detection with respect to SS block candidates transmitted from a high frequency axis of a carrier or cell (hereinafter, cell) on which cell search or initial access is to be performed, and perform detection with respect to SS block candidates transmitted from a low frequency axis. When a candidate frequency axis location in which an SS block is transmittable is defined or set in the corresponding cell, the terminal attempts the SS block detection at the candidate frequency axis location. For example, the terminal may attempt SS block detection in an order of an SS block set #1 transmitted from the low frequency axis after detection with respect to an SS block candidate transmitted from an SS block set #2 transmitted from the high frequency axis with respect to the cell. In particular, referring to FIG. 6, the terminal may attempt the SS block detection with respect to the SS block #0 609 and the SS block #1 610 after the SS block detection with respect to the SS block #0 615 and the SS block #1 616. At this time, in order to minimize a time change for the SS block detection, the terminal may attempt the SS block detection by minimizing a change in the SS block detection time axis location, for example, an order of the SS block #0 615, the SS block #1 616, the SS block #1 610, and the SS block #0 609.

Regarding the above methods, during SS block detection procedure, when a size of PSS/SSS reception signal for an SS block, a size of a correlation value, or a size of a reception signal of a demodulation reference signal (DMRS) for a PBCH of an SS block is greater than a pre-defined value or when decoding with respect to PBCH of an SS block is successful, a terminal may end or stop the SS block detection procedure and perform an initial access procedure by using the SS block. For example, the terminal may receive system information from a control region indicated by the PBCH of the SS block. In this case, even when the SS block is detected, the terminal may continuously attempt SS block detection at candidate frequency and time locations in which remaining SS blocks are transmittable. When a plurality of SS blocks are detected, the terminal may perform the initial access procedure by using a SS block in which the size of the PSS/SSS reception signal for the SS block, the size of the correlation value, the size of the reception signal of the DMRS for the PBCH of the SS block, or the size of the reception signal of the DMRS of the control region indicated by the PBCH of the SS block is the largest, or may perform the initial access procedure by using an SS block that is detected first or an SS block that is detected last. Here, the terminal may perform the initial access procedure by arbitrarily selecting one of the detected SS blocks. Also, even when the SS block is detected, the terminal may not receive the system information from the control region indicated by the PBCH of the detected SS block, the terminal may perform the initial access procedure by using all detected SS blocks. In other words, the terminal may receive the system information from the control region indicated by the PBCH of each detected SS block and continue the initial access procedure according to the received system information. When the system information indicates different types of information, the terminal may perform the initial access procedure by arbitrarily selecting one piece of the received system information or by selecting the SS block in which the size of the PSS/SSS reception signal for the SS block, the size of the correlation value, the size of the reception signal of the DMRS for the PBCH of the SS block, or the size of the reception signal of the DMRS of the control region indicated by the PBCH of the SS block is the largest.

Second Example

In a 5G or NR system, a base station or cell may transmit up to 64 SS blocks in a specific time interval (for example 5 ms). Here, the maximum number L of SS blocks may vary according to at least one value among a subcarrier spacing and a carrier frequency in which an SS block is transmitted. For example, maximum 4 SS blocks may be transmitted in a frequency band of 3 GHz or lower, maximum 8 SS blocks may be transmitted in a frequency band from 3 GHz to 6 GHz, and maximum 64 SS blocks may be transmitted in a frequency band of 6 GHz or above in the corresponding time interval. Here, the maximum number of SS blocks is the maximum value and the number of SS blocks less than the maximum value may be transmitted based on settings of the base station or cell. Also, location information of the SS block that is actually transmitted may be transferred via a system information block or higher signal transmitted to the terminal via a DL data channel. Accordingly, in the case of a terminal that performs an initial access operation with a cell of a frequency band, there is no information about the SS block being actually transmitted from the base station or cell, and thus the terminal may perform an initial access procedure with the cell considering that the base station or cell will transmit as many of the SS blocks as the maximum number of SS blocks defined for each frequency band in which initial access is to be performed (for example, L=64 in the case of a cell less than or equal to 6 GHz). Thus, a method, performed by the terminal, of efficiently detecting an SS block is required.

Figure 7:
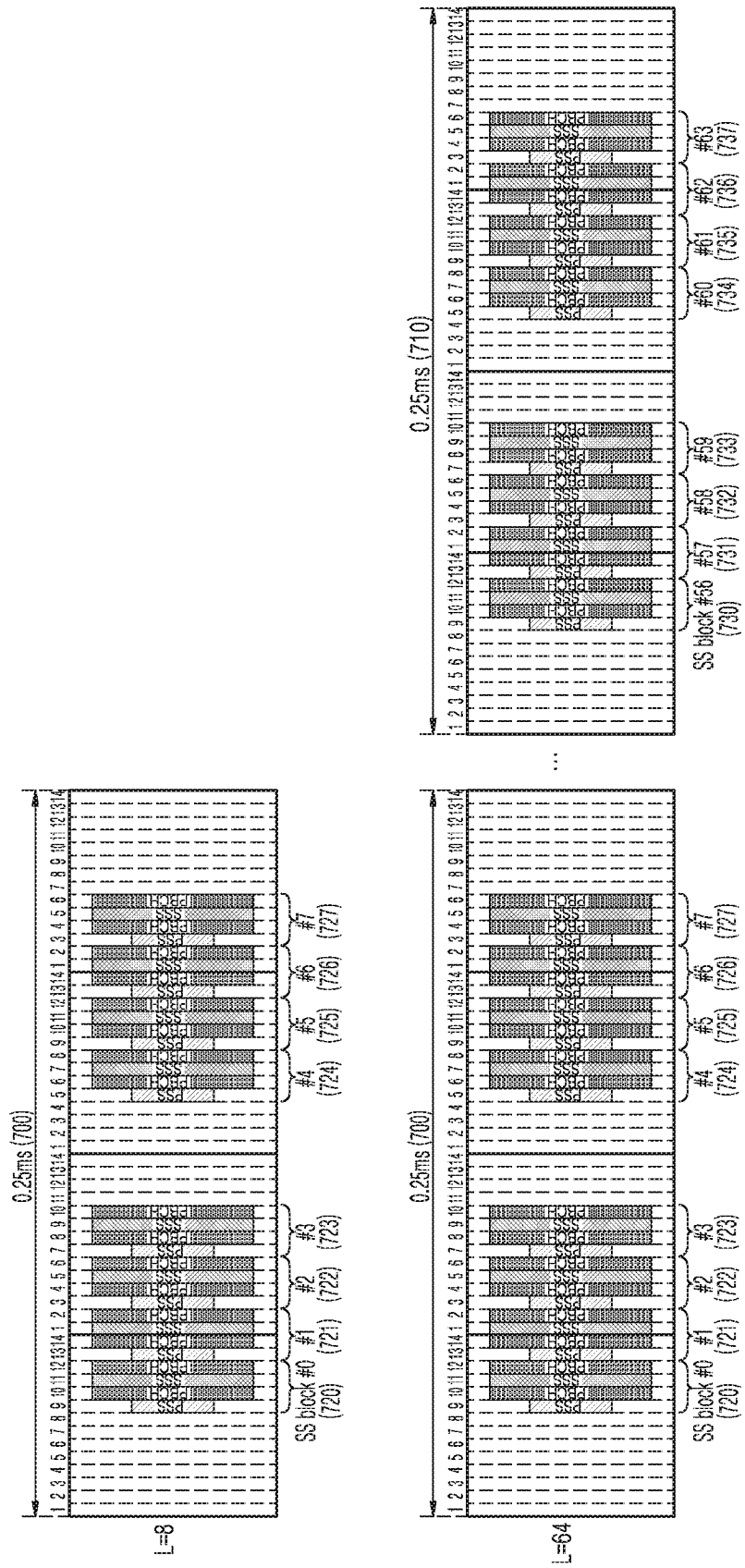
FIG. 7 is a diagram showing transmittable locations for SS blocks having a 240 KHz subcarrier spacing in a 5G or NR system, according to an embodiment.

FIG. 7 is a diagram showing transmittable locations for SS blocks having a 240 KHz subcarrier spacing in a 5G or NR system, according to an embodiment.

Referring to FIG. 4, a transmittable interval of maximum 8 SS blocks during a time (0.25 ms) for 4 slots is defined. Accordingly, at least 2 ms is required to transmit maximum 64 SS blocks, and a terminal that performs an initial access procedure needs to perform a detection operation with respect to 64 available SS block candidates.

The terminal attempts synchronization signal (PSS/SSS) detection by using an SS block detection method described in the first example. Upon determining that the PSS/SSS is detected, the terminal may decode PBCH of a detected SS block to obtain information about a control channel region for obtaining system time synchronization and receiving system information. Here, the PBCH may be modulated via DMRS. Here, the terminal may obtain entire or partial information of an index of an SS block where the synchronization signal is detected (or time location or slot and symbol location) via a DMRS sequence. For example, when L=8 in FIG. 7, a base station may transmit the DMRS by matching DMRS sequences (DMRS #1 through DMRS #8) of the PBCH and the indexes of SS blocks (SS block #1 through SS block #8) in an 1:1 manner. In other words, the DMRS for the PBCH of the SS block #1 is DMRS #1. In the 5G or NR system, matching of maximum 8 DMRS sequences and SS block indexes is supported.

Because the SS block indexes and the PBCH DMRSs are matched in an 1:1 manner, in order to decode the PBCH of the SS block where the synchronization signal is detected, the terminal may attempt to decode the PBCH by using DMRS sequence candidates (DMRS #1 through DMRS #8) and determine an index of the SS block via an DMRS sequence index used for successful decoding of PBCH. Referring to the case of L=8 in FIG. 7 in more detail, the terminal attempts the synchronization signal (PSS/SSS) detection via the SS block detection method as described in the first example. Upon determining that the PSS/SSS is detected from an SS block #4 724, the terminal attempts PBCH decoding of the detected SS block #4 724. Here, because the terminal does not know the actual index of the SS block #4 724 (that is, the terminal does not know whether the detected SS block is an SS block #1 or an SS block #4), the terminal attempts PBCH decoding of the detected SS block by using a DMRS #1 through DMRS #8 sequence that may be used as a PBCH DMRS in an SS block candidate, and succeeds in the PBCH decoding via the DMRS #4. Here, the terminal may determines that the detected SS block is the SS block #4 and obtain control channel region information for receiving SFN, time synchronization, and system information via a transmission location of the defined SS block #4. Upon obtaining the control channel region information for receiving the SFN, time synchronization, and system information via the SS block #4, the terminal may attempt additional SS block detection. In a system using a plurality of analog beams, such as the 5G or NR system, the terminal may detect an analog beam of which the intensity of a reception signal is greater than a pre-detected analog beam of an SS block or an SS block corresponding to the analog beam. In other words, the terminal that detected the SS block #4 may perform an SS block detection operation with respect to an SS block candidate location after a pre-detected SS block (SS block #4), such as SS block #5 and #6, and perform the initial access procedure by using one or more of the detected SS blocks. Here, the terminal may perform more efficient SS block detection operation by using information about the pre-detected SS block. This will now be described in detail.

As described above, the terminal may detect the SS block #4 and obtain the control channel region information for receiving the SFN, time synchronization, and system information via the SS block #4. The terminal that performs the additional SS block detection after obtaining the SS block #4 may infer, by obtaining the SS block #4, an SS block transmission candidate location of the cell, locations of SS block #5 725, SS block #6 726, and SS block #7 727, and information about a PBCH DMRS sequence DMRS #5 of the SS block #5 725, a PBCH DMRS sequence DMRS #6 of the SS block #6 726, and a PBCH DMRS sequence DMRS #7 of the SS block #7 727. Accordingly, when the SS block #5 725, the SS block #6 726, and the SS block #7 727 are detected, the terminal may be able to detect an SS block by using the determined synchronization signal location information and PBCH DMRS sequence without having to blindly find the synchronization signal location information and the PBCH DMRS sequence of the SS block. In other words, the terminal may minimize the synchronization signal detection at an unnecessary location by performing the synchronization signal detection at a PSS/SSS location of the SS block #5 725, the SS block #6 726, and the SS block #7 727, and minimize the use of unnecessary PBCH DMRS sequence by attempting to demodulate the PBCH by only using the PBCH DMRS sequence DMRS #5, the PBCH DMRS sequence DMRS #6, and the PBCH DMRS sequence DMRS #7 while decoding the PBCH of the SS block #5 725, the SS block #6 726, and the SS block #7 727. In other words, when an SS block #k is detected, the terminal may minimize unnecessary SS block detection attempts by using determined synchronization signal location information and a PBCH DMRS sequence for SS block detection from transmittable SS block #k+1 to SS block #L after at least the detected SS block #k. The operation may be summarized as below via Table 1.

TABLE 1

| When L = 8, | PSS/SSS Detection | PBCH Detection/Demodulation |
|---|---|---|
| SS block index #1 | Attempt PSS detection for each symbol | N/A |
| SS block index #2 | Attempt PSS detection for each symbol | N/A |
| SS block index #3 | Attempt PSS detection for each symbol (PSS/SSS detection) | Attempt PBCH decoding via all of DMRS sequence #1 to #8 |
| SS block index #4 | Attempt detection at PSS/SSS location of SS block index #4 | Attempt PBCH decoding via DMRS sequence #4 during PSS/SSS detection |
| SS block index #5 | Attempt detection at PSS/SSS location of SS block index #5 | Attempt PBCH decoding via DMRS sequence #5 during PSS/SSS detection |
| SS block index #6 | Attempt detection at PSS/SSS location of SS block index #6 | Attempt PBCH decoding via DMRS sequence #6 during PSS/SSS detection |
| SS block index #7 | Attempt detection at PSS/SSS location of SS block index #7 | Attempt PBCH decoding via DMRS sequence #7 during PSS/SSS detection |
| SS block index #8 | Attempt detection at PSS/SSS location of SS block index #8 | Attempt PBCH decoding via DMRS sequence #8 during PSS/SSS detection |

The terminal attempts the SS block detection in an order shown in Table 1, but when a PSS/SSS is detected but PBCH is not detected or decoded via a DMRS sequence according to Table 1, the terminal may attempt PBCH detection or decoding by using all DMRS sequence candidates. For example, when the terminal detected a PSS/SSS of the SS block index #5 with respect to the SS block index #5, but failed to detect or decode a PBCH of the SS block by using the DMRS sequence #5, the terminal may reattempt to detect the PBCH by using remaining DMRS sequences excluding the DMRS sequence #5.

Meanwhile, when L=64, LSB 3 bit information of an SS block index may be matched with a DMRS sequence and MSB 3 bit information may be transferred from PBCH of an SS block. In this case as well, the terminal may further efficiently perform the SS block detection after pre-detected SS block by using information about the pre-detected SS block, via a method proposed in the first example and/or the second example.

Figure 8:
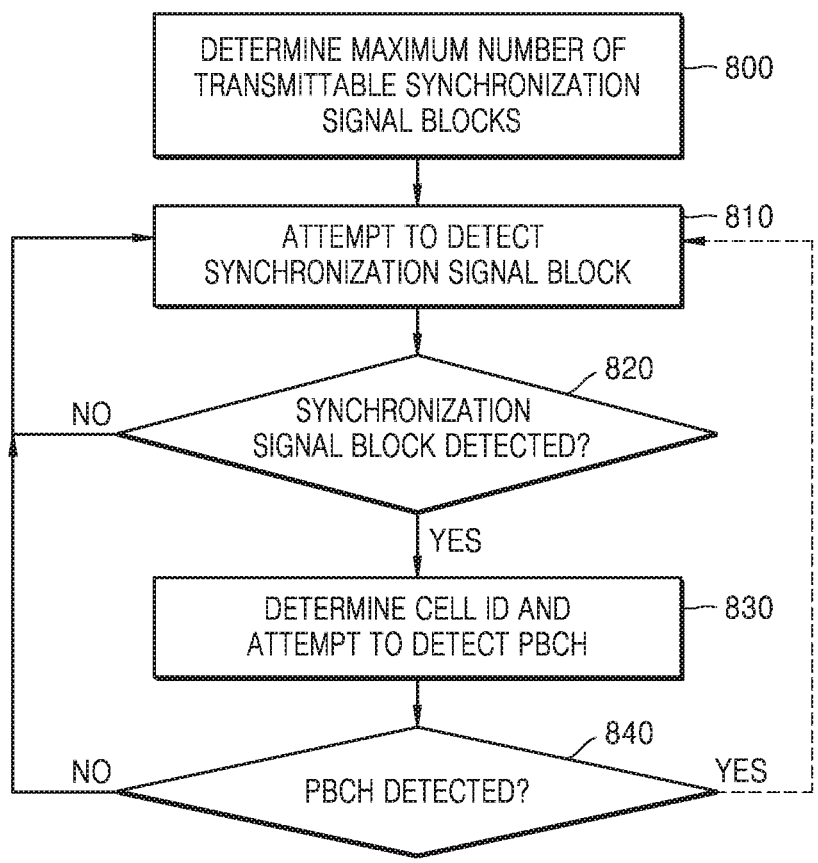
FIG. 8 is a diagram showing operations of a terminal, according to an embodiment.

FIG. 8 is a diagram showing operations of a terminal, according to an embodiment.

Referring to FIG. 8, in operation 800, the terminal determines a frequency band of a base station or cell where an initial access procedure is to be performed and determines the maximum number L of SS blocks transmittable by the base station or cell in the determined frequency band. In operation 810, the terminal performs synchronization signal detection by comparing correlation values of synchronization signals or the like. When it is determined that a synchronization signal is detected in operation 820, the terminal determines a cell ID from the synchronization signal and attempts to detect or decode a PBCH of an SS block where the synchronization signal is detected by using the determined cell ID and a DMRS sequence for the SS block, in operation 830. When the terminal that determined that the PBCH is correctly detected or decoded in operation 840 additionally detects an SS block transmittable in a frequency or time different from a pre-detected synchronization signal, the terminal may additionally detect a synchronization signal in operation 810 by using the method of the first example and/or the second example of the present disclosure. Here, the SS block detection may be performed as much as the maximum number L of the transmittable SS blocks determined in operation 800, and additional SS block detection may be omitted. When the synchronization signal is not detected in operation 820 or the PBCH decoding is failed in operation 840, the terminal may repeat the synchronization signal detection in operation 810.

Figure 9:
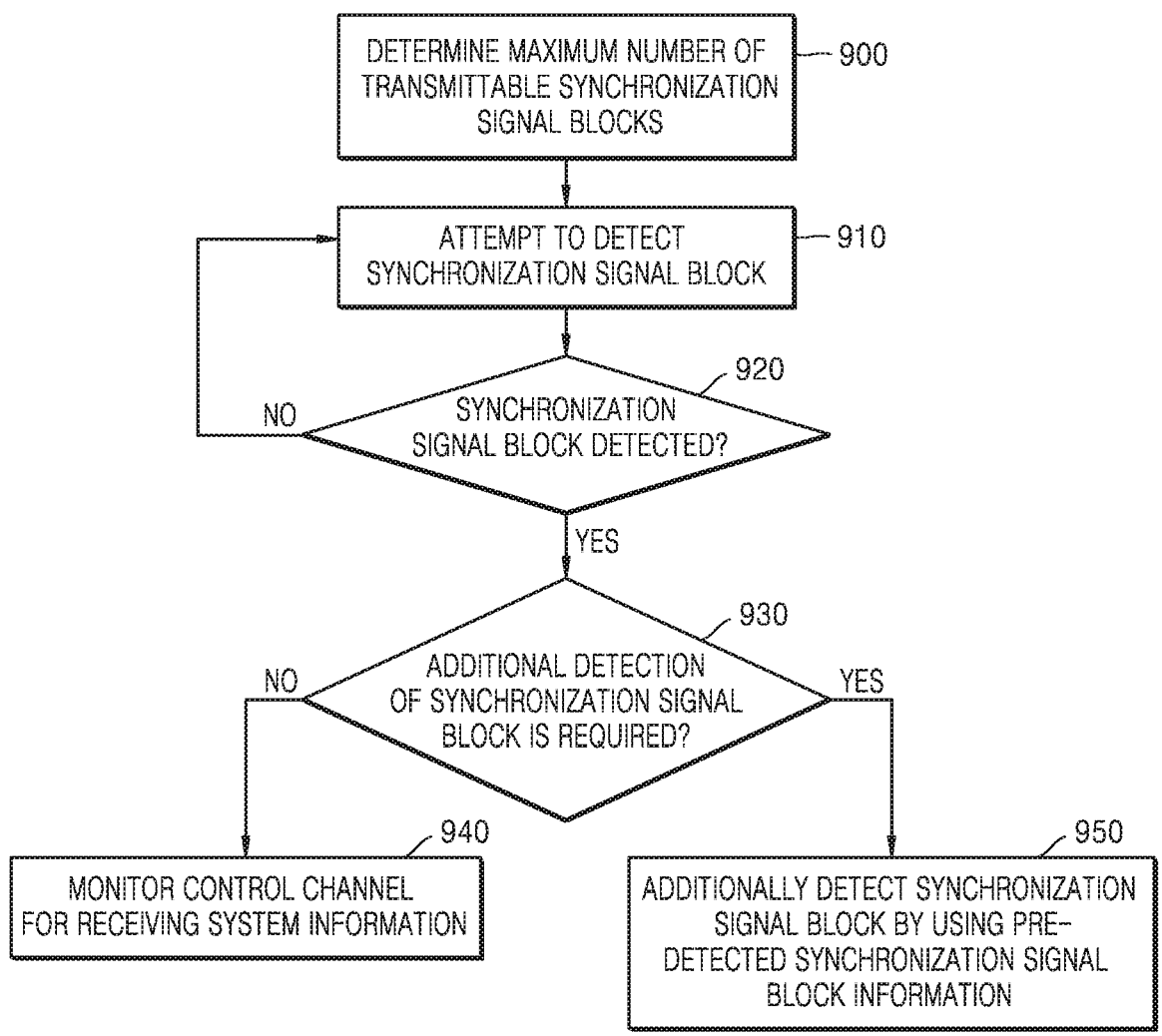
FIG. 9 is a diagram showing operations of a terminal, according to an embodiment.

FIG. 9 is a diagram showing operations of a terminal, according to an embodiment.

Referring to FIG. 9, in operation 900, the terminal determines a frequency band of a base station or cell where an initial access procedure is to be performed and determines the maximum number L of SS blocks transmittable by the base station or cell in the determined frequency band. In operation 910, the terminal performs synchronization signal detection by comparing correlation values for synchronization signals or the like, and when it is determined that a synchronization signal is detected in operation 910, the terminal determines a cell ID from the synchronization signal and attempts to detect or decode a PBCH of an SS block where the synchronization signal is detected by using a DMRS sequence of the SS block. When the terminal that determined that the PBCH is correctly detected or decoded and detected the SS block in operation 920 additionally detects an SS block transmittable in a frequency or time different from a pre-detected synchronization signal in operation 930, the terminal may additionally detect a synchronization signal in operation 950 by using the method of the first example and/or the second example of the present disclosure. Here, the SS block detection may be performed as much as the maximum number L of the transmittable SS blocks determined in operation 900, and additional SS block detection may be further efficiently performed by using information about the pre-detected SS block, for example, DMRS sequence information. When the synchronization signal is not detected in operation 920, the terminal may repeat the synchronization signal detection in operation 910. The terminal that determined that the additional synchronization signal block detection is not required in operation 930 or the terminal that attempted to detect as many SS blocks as the maximum number L of the transmittable SS blocks from the cell in operation 950 may receive system information by monitoring a control channel region for receiving the system information indicated by at least one of the SS blocks among the SS blocks detected in operation 950.

Figure 10:
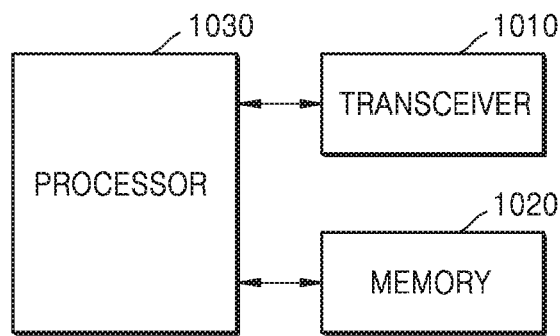
FIG. 10 is a block diagram showing an internal configuration of a terminal, according to an embodiment.

FIG. 10 is a block diagram showing a structure of a base station, according to an embodiment.

Referring to FIG. 10, the base station may include a transceiver 1010, a memory 1020, and a processor 1030. The transceiver 1010, the memory 1020, and the processor 1030 of the base station may operate according to a communication method of the base station described above. However, the components of the base station are not limited thereto. For example, the base station may include more or fewer components than those described above. In addition, the transceiver 1010, the memory 1020, and the processor 1030 may be implemented as a single chip.

The transceiver 1010 may transmit or receive a signal to or from a terminal. Here, the signal may include control information and data. In this regard, the transceiver 1010 may include a RF transmitter for up-converting and amplifying a frequency of a transmitted signal, and a RF receiver for amplifying low-noise and down-converting a frequency of a received signal. However, this is only an embodiment of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the base station. Also, the memory 1020 may store control information or data included in a signal obtained by the base station. The memory 1020 may be a storage medium, such as read-only memory (ROM), random access memory (RAM), a hard disk, a CD-ROM, and a DVD, or a combination of storage media.

The processor 1030 may control a series of processes such that the base station operates as described above. According to an embodiment, the processor 1030 may differently control transmission locations of a plurality of SS blocks and a method based on a frequency axis and a time axis.

Figure 11:
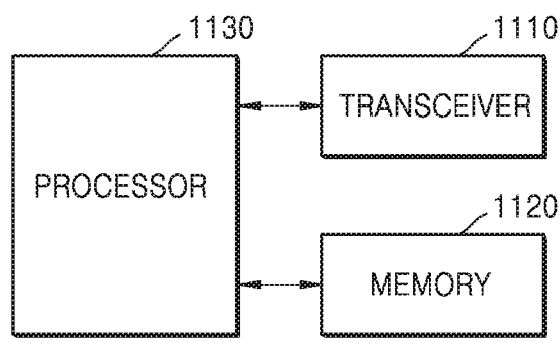
FIG. 11 is a block diagram showing an internal configuration of a base station, according to an embodiment.

FIG. 11 is a block diagram showing an internal configuration of a terminal, according to an embodiment.

Referring to FIG. 11, the terminal may include a transceiver 1110, a memory 1120, and a processor 1130. The transceiver 1110, the memory 1120, and the processor 1130 of the terminal may operate according to a communication method of the terminal described above. However, the components of the terminal are not limited thereto. For example, the terminal may include more or fewer components than those described above. In addition, the transceiver 1110, the memory 1120, and the processor 1130 may be implemented as a single chip.

The transceiver 1110 may transmit or receive a signal to or from a base station. Here, the signal may include control information and data. In this regard, the transceiver 1110 may include a RF transmitter for up-converting and amplifying a frequency of a transmitted signal, and a RF receiver for amplifying low-noise and down-converting a frequency of a received signal. However, this is only an embodiment of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the terminal. Also, the memory 1120 may store control information or data included in a signal obtained by the terminal. The memory 1120 may be a storage medium, such as ROM, RAM, a hard disk, a CD-ROM, and a DVD, or a combination of storage media.

The processor 1130 may control a series of processes such that the terminal operates as described above. According to an embodiment, the processor 1130 may differently control methods of receiving a plurality of SS blocks transmitted in a frequency axis or time axis, detecting a synchronization signal from the received SS block, determining a cell ID via the detected synchronization signal, generating a DMRS sequence for decoding a PBCH of the SS block via the determined cell ID, and decoding the PBCH via the DMRS sequence.

The methods according to the embodiments described in the claims or the detailed description of the present disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the present disclosure are feasible. Also, the embodiments may be combined with each other as required. For example, a portion of one embodiment and a portion of another embodiment of the present disclosure may be combined with each other to enable a base station and a terminal to operate. Also, the embodiments are proposed based on a FDD LTE system, but other modifications based on technical ideas of the embodiments may be implemented on other systems, such as a TDD LTE system, a 5G or NR system, and the like.

The invention claimed is:

1. A method performed by a terminal in a wireless communication system, the method comprising:
   detecting a first synchronization signal block;
   determining at least one second synchronization signal block candidate based on the first synchronization signal block, wherein the at least one second synchronization signal block candidate is transmitted with a different frequency or time from the first synchronization signal block;
   detecting at least one second synchronization signal block based on the at least one second synchronization signal block candidate;
   selecting at least one synchronization signal block among the first synchronization signal block and the at least one second synchronization signal block; and
   performing an initial access procedure based on the selected at least one synchronization signal block.

2. The method of claim 1, wherein the detecting of the first synchronization signal block comprises identifying an index of the first synchronization signal block, and
   the detecting of the at least one second synchronization signal block comprises:
   predicting at least one index of the at least one synchronization signal block, based on the index of the first synchronization block; and
   detecting the second synchronization signal block, based on the at least one predicted index.

3. The method of claim 2, wherein the identifying of the index of the first synchronization signal block comprises:
   demodulating a physical broadcast channel (PBCH) included in the first synchronization signal block, based on a demodulation reference signal (DMRS) among DMRS candidates; and
   identifying the index of the first synchronization signal block based on the DMRS.

4. The method of claim 1, wherein the detecting of the at least one second synchronization signal block comprises:
   identifying a plurality of frequency positions at which the at least one second synchronization signal block candidate is transmitted based on a control signal transmitted from a base station;
   detecting a second synchronization signal block in at least one of a time sequence or a frequency sequence.

5. A terminal comprising:
   a transceiver; and
   a processor configured to:
   detect a first synchronization signal block,
   determine at least one second synchronization signal block candidate based on the first synchronization signal block, wherein the at least one second synchronization signal block candidate is transmitted with a different frequency or time from the first synchronization signal block,
   detect at least one second synchronization signal block based on the at least one second synchronization signal block candidate,
   select at least one synchronization signal block among the first synchronization signal block and the at least one synchronization signal block, and
   perform an initial access procedure with the base station based on the selected at least one synchronization signal block.

6. The terminal of claim 5, wherein the processor is further configured to identify an index of the first synchronization signal block, predict at least one index of the at least one synchronization signal block, based on the index of the synchronization signal block, and detect the second synchronization signal block, based on the at least one predicted index.

7. The terminal of claim 6, wherein the processor is further configured to demodulate a physical broadcast channel (PBCH) included in the first synchronization signal block, based on a demodulation reference signal (DMRS) among DMRS candidates, and identify the index of the first synchronization block based on the DMRS.

8. The terminal of claim 6, wherein the processor is further configured to identify a plurality of frequency positions at which the at least one second synchronization signal block candidate is transmitted based on a control signal transmitted from the base station, detect a second synchronization signal block in at least one of time sequence or frequency sequence.

\* \* \* \* \*